(Model.)
W. S. OVENS.
CAKE MACHINE.
No. 269,535. Patented Dec. 26, 1882.
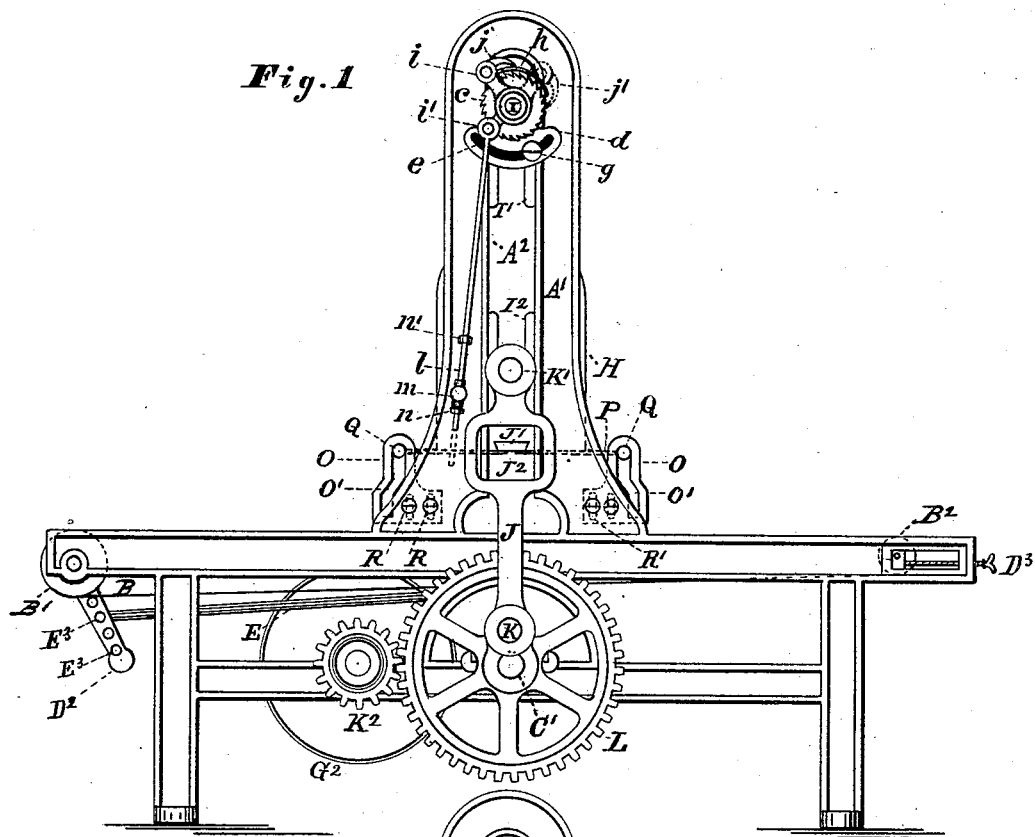
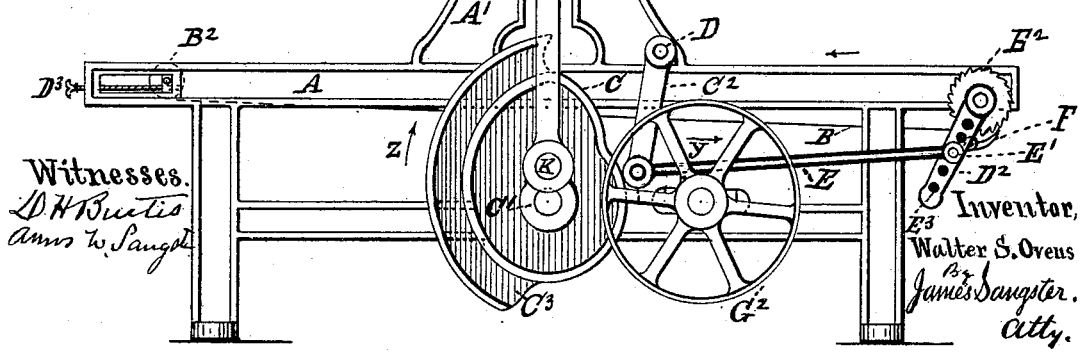
Witnesses. Inventor,
Walter S. Ovens
By James Sangster.
Atty.

(Model.)
W. S. OVENS.
CAKE MACHINE.
No. 269,535.   Patented Dec. 26, 1882.
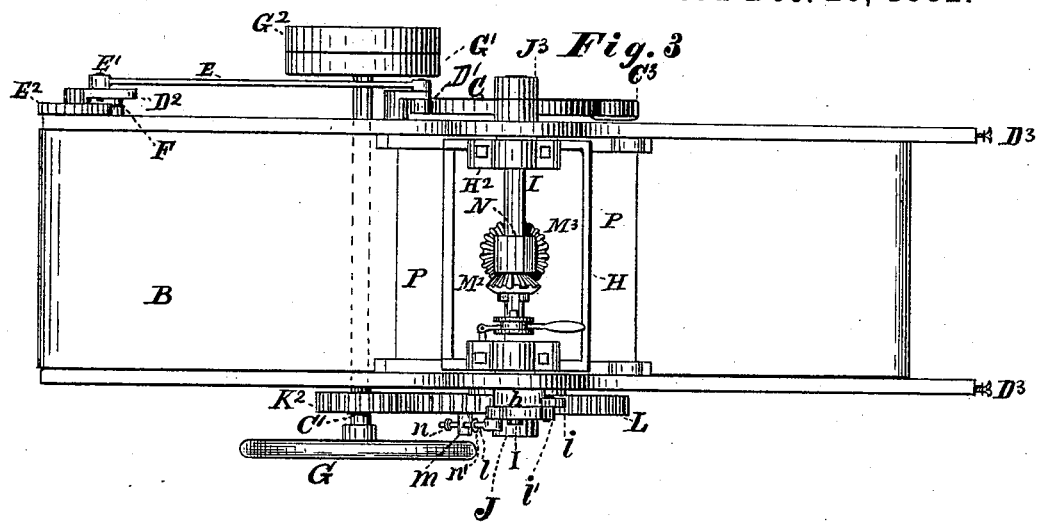
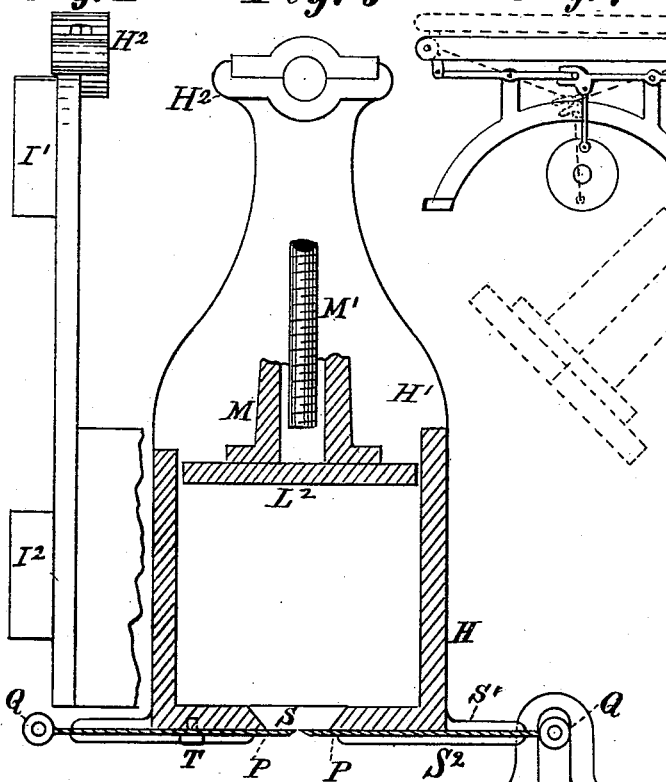
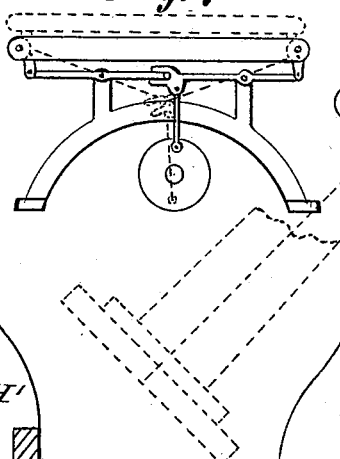
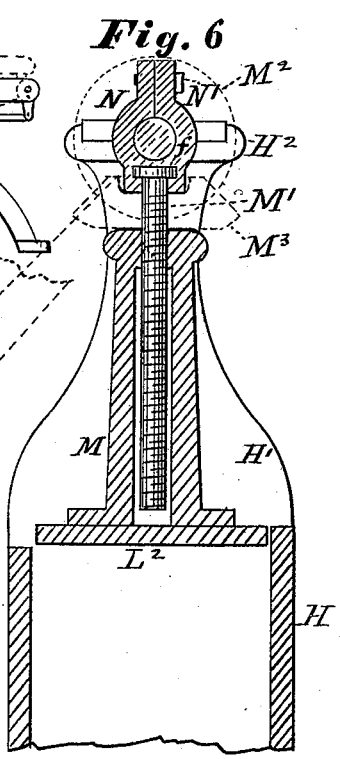
Witnesses
D. H. Burtis
Amos W. Sangster
Inventor.
Walter S. Ovens.
By James Sangster
Atty.

UNITED STATES PATENT OFFICE.

WALTER S. OVENS, OF BUFFALO, NEW YORK, ASSIGNOR TO CHARLES E. BENEDICT AND GEORGE B. WEBSTER, OF SAME PLACE.

CAKE-MACHINE.

SPECIFICATION forming part of Letters Patent No. 269,535, dated December 26, 1882.

Application filed August 11, 1880. (Model.)

*To all whom it may concern:*

Be it known that I, WALTER S. OVENS, a citizen of the United States, residing in the city of Buffalo, in the county of Erie and State of New York, have invented certain new and useful Improvements in Cake-Machines, of which the following is a specification.

Cakes such as my invention is adapted for making have heretofore been made by means of a canvas or rubber-cloth bag held and worked by the hands of the operator, the bag being provided with a small opening at the bottom. Into this bag a sufficient quantity of the soft cake material is placed, the opening at the bottom being kept closed by the hand until it is required to drop some of the material to form a cake, when the hand is opened slightly, and the necessary quantity drops onto the tray; or, if it does not flow fast enough, a slight pressure from the hand forces it out. The bag is now quickly moved up, and if required the opening in the bag is closed by the hand. This operation drops and separates a sufficient quantity to form a cake, and is repeated until the tray is filled.

The object of my invention is to produce a machine for making such cakes more rapidly, more uniformly, and more cheaply than can be made by hand; and it consists of a cake-machine provided with the usual endless apron, and a suitable means for giving it an intermittent movement, in combination with a vertically-reciprocating dough-box provided with the usual follower, and mechanism for forcing the dough or cake material through one or more openings in the bottom of the box. The object in making the dough-box movable vertically is that it may deposit a portion of the cake material upon the tray from each opening during its downward movement, and separate the same from the bottom at some point during its upward movement, as will be more clearly hereinafter shown.

My invention further consists in the combination, with the dough-box of a cake-machine, of one or more sliding plates arranged at the bottom of the same, and operated by suitable mechanism, as will be more clearly hereinafter described, for the purpose of opening and closing the opening at the bottom of the dough-box at the proper times during the operation of the machine, and cutting off the dough when it is too thick to be separated by the motion of the box alone, all of which will be more clearly understood by reference to the drawings, in which—

Figure 1 is a side elevation of the machine, showing the mechanism for giving the dough-box a reciprocating movement up and down, also a portion of the machinery for imparting an adjustable reciprocating movement to the dough-box plunger. Fig. 2 represents a side elevation, showing the opposite side of the machine. Fig. 3 is a plan or top view of the machine. Fig. 4 is an enlarged side elevation of one end of the dough-box and a portion of said box. Fig. 5 represents an enlarged cross-section through the dough-box and follower, also a view of one of the cams for moving the valves or sliding plates for cutting off the dough. Fig. 6 is a section through the dough-box plunger and screw-column, and through a portion of the dough-box; and Fig. 7 is a diagram on a small scale representing a modification of my invention, showing a suitable means for giving the tray a vertical movement instead of the dough-box, by which the same result may be obtained, but perhaps not so conveniently.

A represents the frame of the machine. It is made of cast-iron, and held together in the usual way, and is provided with the vertical sides, A', having the slideways $A^2$.

B represents the endless apron. It is connected to the frame by the usual rollers, B' $B^2$, (see Fig. 1,) and receives its movements by means of a cam, C, on the crank-shaft C', (see Fig. 2,) and an arm, $C^2$, pivoted to the frame by a pin or bolt, D, so as to swing easily. To the arm $C^2$ is connected in the ordinary way a friction-roller, D', and an arm, E, having its opposite end connected in the usual way by a pin or adjusting-bolt, E', to an arm, $D^2$, which is arranged to vibrate easily on the roller-shaft of roller B'. To the said shaft is rigidly fastened a ratchet-wheel, $E^2$, (shown in Fig. 2,) and to the arm $D^2$ is pivoted in the usual way a pawl, F. It will now be seen that as the crank-shaft and cam C turns in the direction of the arrow $z$ (see Fig. 2) it will cause the arms $C^2$, E, and $D^2$ to move in the direction of the arrow $y$, and by means of the pawl F it will turn the ratchet-wheel $E^2$ and rollers B', so as to move the apron one step forward (at the upper side) for each revolution of the crank-shaft. The length of each movement of the apron is adjusted by moving the arm E and bolt E' and fastening them in any one of the holes E³ in the arm D², and in the usual way, as will be readily understood by reference to Fig. 2. The tightness of said apron on the rollers B' B² is regulated in the ordinary manner by the thumb-screws D³. The grooved portion C³ of the cam C gives the reverse movement to the arm D² and its connecting parts.

G represents the fly-wheel, G' the driving-pulley, and G² the loose pulley.

H is the dough-box. It is provided with a vertical piece, H', at each end, having boxes H² for the shaft I, and projections I' I², which fit into the slideways A², so as to keep the dough-box and its connections in line during its vertical movements.

J in Fig. 1 represents the connecting-rod, having an opening, J², through which the plates J' are introduced into the bottom of the dough-box, said plates J' being provided with a series of holes through which the dough is forced when the machine is in operation, and they are constructed in the ordinary way. J³ represents the connecting-rod on the opposite side of the machine. (See Fig. 2.) Both connecting-rods are connected by a pin, K, to the crank on the shaft C', and the upper ends are connected to the dough-box by a pin, K'. By this arrangement it will be seen that by turning the crank-shaft C' by means of the driving-pulley G' and gearing K² L the dough-box will receive a vertical reciprocating movement.

L² represents the dough-box follower. It is provided with one or two of the usual columns, M, screw M', and bevel-gearing M² M³, for the purpose of moving the follower up or down into the dough-box. The gear-wheel M² is placed on the shaft I and the wheel M³ on the screw M'. The screw is kept up in place by a box, N, made in two pieces and held together by a bolt, N', the head f of the screw being fitted between them so as to turn easily, as shown in Fig. 6. It will now be seen that the screw M' will be turned by turning the shaft I, and consequently the gearing M² M³.

To one end of the shaft I (see Fig. 1) is rigidly fastened a ratchet-wheel, c, and between the frame and the wheel c is a plate, d, also fitted to the shaft I, but loosely, so as to be easily turned thereon. It is provided with a curved slot e, into and through which a set-screw, g, passes, and screws into the part H' of the dough-box. The object of the screw g is to fasten the plate d at any point desired within the limits of the slot e. At the top of the plate d is a curved rim, h, which projects outward, so as to cover the teeth on the upper part of the ratchet-wheel c.

i is an angular pawl-arm, fitted loosely on the outer end of the shaft I, outside of the ratchet-wheel c, so as to turn easily back and forth on said shaft. It is provided with a pawl, j, at one end to engage with the teeth of the wheel c, and an arm or rod, l, pivoted at the other end. i', the lower end of which rod l passes loosely through a stud, m, and is provided with stops, n n'. It will be now seen by reference to Figs. 1 and 3 that as the dough-box moves downward, the rod l moves with it, moving through the stud m until about one-half of the down stroke of the dough-box has been made, when the stop n' prevents the further descent of the rod l, and consequently as the dough-box continues its down movement the angular arm i is turned, carrying the pawl j with it and turning the ratchet-wheel one step forward, which operation turns the shaft I, the bevel-wheels M² M³, and the screw M', thereby forcing the plunger L². a slight distance downward for every down movement of the dough-box.

The object of the plate d, with its curved slot e and curved rim h projecting over the teeth of the ratchet-wheel, is to render the movements of the ratchet-wheel adjustable. It will be noticed that the rim h extends around the top of the wheel about the length of the stroke of the angular arm i, and that the pawl j in its backward movement slips over the top of said rim h more or less, according to the adjustment of the rim. If it should be adjusted within one tooth of the whole movement of the pawl forward, then the ratchet-wheel will move one tooth ahead for each forward movement of the pawl. If adjusted within three or four teeth of its full movement, then said wheel will be moved three or four teeth forward for every forward movement of the pawl.

O represents a slotted cam for operating the cut-off slides P of the dough-box by the up-and-down movement of said box. There are four of said cams, two on each side of the frame. (See Figs 1, 3, and 5.) They are bolted to the frame by bolts R, which pass through slots R', so as to be adjustable vertically. The shut-off slides P are provided on each side with a friction-roller, Q, which fits into and works in the slots O' of the cams O. (See Fig. 5.) As the dough-box moves up and down the slides P are held in place by the parts S' S², which act as slideways for them. It is obvious that a downward movement of the dough-box will cause the slides P to open, and that an upward movement will cause them to shut and cut off the dough.

The operation of the machine is as follows: The dough-box being filled with dough and at the limit of its upward movement, as shown in Figs. 1 and 2, and the cam C being moved in the direction of the arrow z, said cam moves the endless apron B one step forward on the upper side. During this time the dough-box descends to about one-sixth (more or less) of its downward movement when the friction-rollers Q, which are connected with the slides P and move down with the dough-box, reach the inclined portion of the cam-slots O', and as the dough-box continues its descent for about one or two sixths of its downward movement, it will be readily seen that the slides P will be opened. After the dough-box has descended to about the point last mentioned the stop $n'$ on the rod or arm $l$ has descended far enough to come in contact with the lug $m$, which prevents the further descent of the rod $l$, and consequently the remaining downward movement of the dough-box causes the arm $i$ and pawl $j$ to turn the ratchet-wheel $c$, and through the gearing heretofore mentioned it forces the follower $L^2$ down into the dough-box a sufficient distance to force out dough enough to drop the required number of cakes on the tray. During the upward movement of the dough-box the dough is either broken off during such movement or is cut off by the slides P being shut, as hereinbefore mentioned. As the machine continues the operation is repeated.

In the modification shown in Fig. 7 I have shown that the same result can be reached by causing the endless apron to move vertically up and down to and from a stationary dough-box. The full lines represent its position downward, and the dotted lines showing it at the limit of its upward movement in said figure. Of course it will be readily seen and understood that all the movements of the cams and gearing for operating the dough-box follower can be given just as well by the vertical movement of the apron as by the dough-box, and that the cam C will move the arms E and $D^2$, and thereby give the endless apron its proper forward movements equally as well as it would if it did not have a vertical movement, there being in that case only a little difference in the length of the feed, which could be easily provided for by changing either the throw of the cam C or the length of the arm $D^2$ to allow for the difference, if necessary. Another equivalent way of giving the endless apron and tray a vertical movement would be to connect the apron-frame by cranks or eccentrics at each end, and gear the crank-wheels together by chains or other suitable means, so as to move simultaneously. In some cases when the dough is thin enough to flow sufficiently easy the shut-off slides may be dispensed with, and when it is very thin the follower need not be used. For some purposes the endless apron may have the usual continuous movement instead of an intermitting movement, as hereinbefore mentioned, and, if desired, the dough-box may be moved by means of cams instead of cranks and connecting-rods, as described.

I claim as my invention—

1. In a cake-machine, an intermittingly-moving endless apron for carrying the tray along as the cakes are deposited thereon, in combination with a vertically-movable dough-box provided with a follower, $L^2$, and a suitable mechanism, substantially as specified, for giving it the necessary movements.

2. In a cake-machine, the combination of a movable dough-box with the cams O and cut-off slides P, for the purpose of cutting off the dough during each movement of the dough-box, as herein set forth.

3. In a cake-machine, a movable dough-box provided with a shaft, I, and gearing $M^2$ $M^3$, in combination with a ratchet-wheel and pawl, a stud, $m$, and arm $l$, having stops $n$ $n'$, for giving the required intermitting movements to the follower, substantially as described.

4. In a cake-machine, the combination, with a material box, of a pan-supporting table, and mechanism for vertically moving one toward and away from the other, whereby when the machine is in operation the material flows from the nozzle upon the pan, and when the deposit is made the connection between the deposit and the box breaks, substantially as set forth.

5. A movable dough-box provided with one or more slides, P, in combination with one or more cams, O, made adjustable, as and for the purposes described.

WALTER S. OVENS.

Witnesses:
GEO. H. HUGHSON,
JAMES SANGSTER.